(No Model.)

C. C. DURFEE.
RAIL CLIMBING DEVICE FOR VEHICLE WHEELS.

No. 590,391.  Patented Sept. 21, 1897.

WITNESSES.
James Gardiner
H. S. Rollins

INVENTOR.
Charles Crozier Durfee
BY John Day
ATTORNEY.

UNITED STATES PATENT OFFICE.

CHARLES CROZIER DURFEE, OF LOS ANGELES, CALIFORNIA.

RAIL-CLIMBING DEVICE FOR VEHICLE-WHEELS.

SPECIFICATION forming part of Letters Patent No. 590,391, dated September 21, 1897.

Application filed November 24, 1896. Serial No. 613,316. (No model.)

*To all whom it may concern:*

Be it known that I, CHARLES CROZIER DURFEE, a citizen of the United States, residing at the city of Los Angeles, in the county of Los Angeles and State of California, have invented Improvements in a Device for Aiding the Passage of Vehicle-Wheels Across or Over the Rails of Street-Railways, of which the following is a full, clear, and exact description or specification, reference being had to the annexed sheet of drawings and to the letters marked thereon.

My invention relates to improvements in a device for aiding the passage of vehicle-wheels across or over the rails of street-railways; and it has for its object not only to prevent, as far as possible, the tires and fellies of the narrow wheels of some vehicles from getting into the grooves of rails used on or in street-railways, but it has also for its object to enable such light wheels, as well as wheels of wagons, trucks, or other heavy vehicles, when they become engaged with and slide along the edges of the rails of street-railways, to be lifted up, on or over the tops of said rails by the improvements constituting my invention in the act of the rotation of the wheels to which my device is attached, causing my said device to engage with and mount the rail, simultaneously lifting the wheel so that it passes over the rail.

My device consists of a triangular and curved metallic body which projects from the side of the felly of the wheel. This body is so attached to the felly of the wheels of vehicles that when, as is the case in four-wheeled vehicles, rubbing-plates are used for the tires of the front swiveling wheels to rub against the curved edges of the body constituting my device pass easily across the edge of each such rubbing-plate without producing any blow or shock and at the same time enable the wheel to mount upon and over the rail of the street-railway when it comes in contact therewith.

My invention is also applicable to the wheels of two-wheeled vehicles, as well as all the wheels of four-wheeled vehicles.

Figure 3:
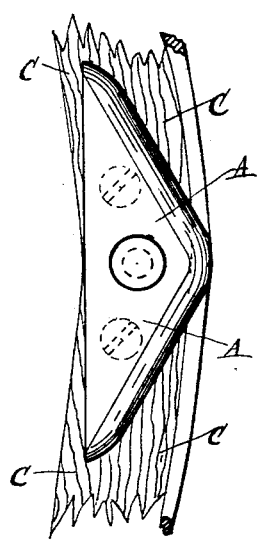
Figure 2:
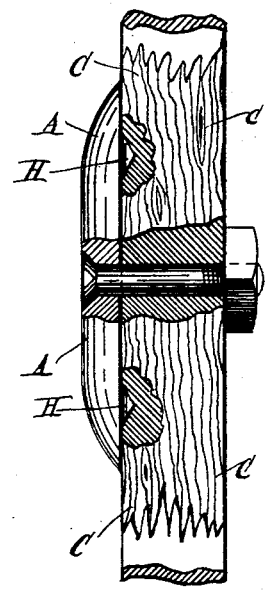

Upon the annexed sheet of drawings, Figure 1 is an elevation of the inner side of a portion of a felly and tire of one of the wheels of a vehicle, showing my device applied thereto, this device being made of a triangular form and having rounded edges, as hereinbefore referred to. Fig. 2 is an elevation of a portion of the inner side of a felly and tire of a wheel corresponding to Fig. 1, a part of the felly being broken away in order the better to show the construction of the said device and the means of its attachment.

My device as shown by the drawings is more especially adapted for the swiveling wheels of four-wheeled vehicles in which the projecting piece A consists of a triangular plate having the apex of the triangle situated at the outside of the felly and tire. The edges of this plate are not only formed triangularly, but also sufficiently curved to get rid of any rectangular projection which might in the rotation of the wheel hit upon or against a rubbing-plate such as is used upon four-wheeled vehicles.

The device A is attached to the felly of the wheel by a bolt and nut, as shown, but it may also be attached thereto by means of ordinary wood-screws, the ends of which are shown in dotted lines in Fig. 1; and for the purpose of more securely maintaining the device A in its proper working position on the felly its inner face may be formed with two or more projecting teeth H, as shown at Fig. 2, which as the bolt or wood-screws are tightened press into and hold in the wood of the felly.

Having now described the nature of my said invention and the best system, mode, or manner I am at present acquainted with for carrying the same into practical effect, I desire to observe, in conclusion, that what I consider to be novel and original, and therefore claim as the invention to be secured to me by Letters Patent, is as follows:

The device for facilitating the passage of the wheels of vehicles by causing them to mount upon the rails of street-railways, consisting of a triangular and curved-edge plate having the apex of the triangle situated toward the periphery of the felly and tire, the same being securely fastened to the fellies of vehicle-wheels and operating in the manner and for the purposes substantially as set forth.

In testimony whereof I have hereunto set my hand and affixed my seal in presence of two subscribing witnesses.

CHARLES CROZIER DURFEE. [L. S.]

Witnesses:
H. S. ROLLINS,
ST. JOHN DAY.